F. L. TOEPPERWEIN.
GASKET OR WASHER.
APPLICATION FILED APR. 14, 1913.

1,100,630.

Patented June 16, 1914.

Ferdinand L. Toepperwein,
Inventor

Witnesses by C. A. Snow & Co.
Attorneys

UNITED STATES PATENT OFFICE.

FERDINAND L. TOEPPERWEIN, OF SAN ANTONIO, TEXAS.

GASKET OR WASHER.

1,100,630. Specification of Letters Patent. Patented June 16, 1914.

Application filed April 14, 1913. Serial No. 761,122.

*To all whom it may concern:*

Be it known that I, FERDINAND L. TOEPPERWEIN, a citizen of the United States, residing at San Antonio, in the county of Bexar and State of Texas, have invented a new and useful Gasket or Washer, of which the following is a specification.

The device forming the subject matter of this application is a gasket or washer adapted to be used upon garden hose, steam pipes, air brake hose, automobile hose, fire hose, and, generally, in any locations in which the structure hereinafter described may be employed with propriety, the scope of the use of the invention being no wise limited.

By way of explanation, it may be stated that when a washer or gasket of circular contour is assembled with a coupling member, the washer or gasket frequently drops out of the coupling member, when the coupling member is detached from its complemental part. As a consequence, the coupling is rendered inoperative and useless until another washer can be provided.

In the present instance, the washer is of oval form and is resilient. The major axis of the washer is slightly greater than the diameter of the bore of the coupling member, and consequently, when the washer is introduced into the coupling member, the washer will expand, and bind against the bore of the coupling member at the ends of the major axis of the washer.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
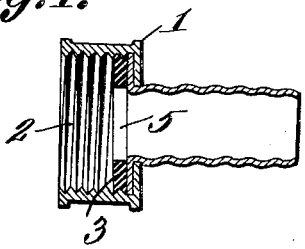
Figure 2:
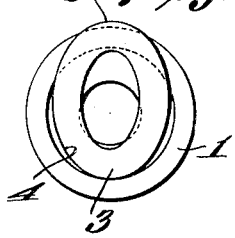
Figure 3:
Figure 4:
Figure 5:
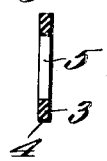
Figure 6:
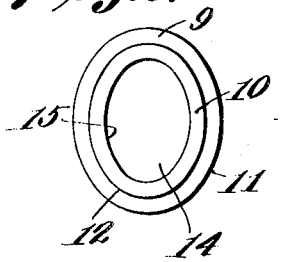
Figure 8:
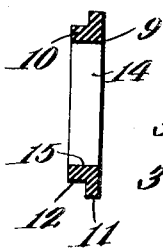
Figure 9:
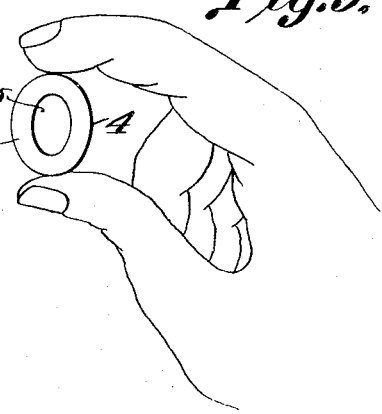
Figure 7:
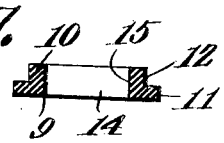

In the drawing: Figure 1 is a longitudinal section of a coupling member showing the washer inclosed therein; Fig. 2 is an end view of the coupling member, showing the washer partially inserted into the coupling member; Fig. 3 is a plan of the washer; Fig. 4 is a transverse section of the washer along the minor axis of the washer; Fig. 5 is a transverse section of the washer along the major axis of the washer; Fig. 6 is a plan showing a slight modification in the washer; Figs. 7 and 8 are sections of the washer shown in Fig. 6, the cutting planes in Figs. 7 and 8 being passed respectively, along the minor and major axes of the washer; and Fig. 9 is a perspective showing the washer or gasket in the hand of the operator and about to be compressed for insertion into the coupling member.

In the drawings, the numeral 1 indicates a female coupling member which may be of any form, the bore of the coupling member being denoted by the numeral 2.

The resilient washer is indicated by the numeral 3. The periphery of the washer 3 is indicated by the numeral 4 and is of elliptical outline. The opening in the washer is shown at 5 and is also of oval form. The major axis of the washer 3 is indicated at 6 and the minor axis of the washer is indicated at 7. The minor axis 7 of the washer approximates the diameter of the bore 2 of the coupling member 1, which bore, ordinarily, is circular. The major axis 6 of the washer, however, is greater than the diameter of the bore 2, as will be understood when Fig. 2 is examined.

In operation, one end of the washer is placed in the bore 2 of the coupling member and pressure is exerted upon the washer at the point 8 and at one end of the major axis 6 of the washer, so that the washer is compressed and is made to fit closely within the bore 2 of the coupling member 1. When the washer 3 is thus positioned within the bore of the coupling member, the washer will tend to expand, the washer binding at the ends of the major axis 6, against the walls of the bore 2. Thus, the washer will be held in place within the coupling member 1, and will not drop out readily. The washer, when inclosed within the coupling member 1, approximates a circular outline, and the opening 5 in the washer which, originally, is of oval form, becomes circular, thereby preventing the flow of fluid through the coupling member from being impeded. The washer, obviously, may be formed from any resilient material, rubber or leather being the material, commonly, but not necessarily employed.

In Figs. 6, 7 and 8, a slight modification in the washer is shown, the washer depicted in Figs. 6, 7 and 8 being of peculiar efficiency in air brake constructions.

In Figs. 6, 7 and 8, the washer is denoted by the numeral 9 and is equipped at one end with an outstanding flange 10. The periphery 11 of the washer proper 9, periphery 12 of the flange 10 and the periphery 15 of the opening 14 in the washer are all of oval form. The proportions between the major and minor axes of the washer 9 and the coupling member remain as above described.

From the foregoing it will be observed that there is disclosed in the application, a washer which may be introduced readily into a coupling member of any sort, the construction of the washer being such that after the washer is mounted in place within the coupling member, the washer cannot become detached accidentally, owing to the tendency of the washer to expand in the direction of its major axis, and to bind against the coupling member adjacent the ends of the major axis.

Having thus described the invention, what is claimed is:—

1. In a device of the class described, a female coupling member; and a normally elliptical, resilient washer, the longer axis of the washer being of greater length than the diameter of the bore of the coupling member, the washer being constrained into circular form within the contour of the coupling member.

2. In a device of the class described, a female coupling member; and a normally elliptical, resilient washer, yieldingly held in the bore of the coupling member, the longer axis of the washer being normally of greater length than the diameter of the bore of the coupling member, the washer having a normally elliptical opening which, along with the washer proper, is constrained to a circular form by the coupling member.

In testimony that I claim the foregoing as my own, I have hereto affixed my signature in the presence of two witnesses.

FERDINAND L. TOEPPERWEIN.

Witnesses:
F. M. EDWARDS,
E. M. HAYS.